United States Patent
Dai et al.

(10) Patent No.: US 7,386,310 B2
(45) Date of Patent: Jun. 10, 2008

(54) FALLBACK MODE INGRESS/EGRESS MECHANISM FOR SATELLITE COMMUNICATION SYSTEM

(75) Inventors: Jerry Dai, Germantown, MD (US); Anwer Khan, Gaithersburg, MD (US); Stan Kay, Rockville, MD (US); Yezdi Antia, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1022 days.

(21) Appl. No.: 10/705,314

(22) Filed: Nov. 10, 2003

(65) Prior Publication Data

US 2004/0127158 A1    Jul. 1, 2004

Related U.S. Application Data

(63) Continuation-in-part of application No. 09/875,607, filed on Jun. 6, 2001, now Pat. No. 7,043,199.

(60) Provisional application No. 60/214,165, filed on Jun. 26, 2000.

(51) Int. Cl.
    *H04Q 7/20* (2006.01)
(52) U.S. Cl. .................. 455/427; 455/12.1; 455/10
(58) Field of Classification Search ........... 455/427, 455/12.1, 13.1–13.4, 10, 422, 505, 522; 370/318, 370/320
See application file for complete search history.

(56) References Cited

U.S. PATENT DOCUMENTS

| | | | | |
|---|---|---|---|---|
| 5,541,955 A | * | 7/1996 | Jacobsmeyer | 375/222 |
| 6,032,041 A | * | 2/2000 | Wainfan et al. | 455/427 |
| 6,212,360 B1 | * | 4/2001 | Fleming et al. | 455/13.4 |
| 6,724,737 B1 | * | 4/2004 | Boyden et al. | 370/316 |

* cited by examiner

*Primary Examiner*—Melur Ramakrishnaiah
(74) *Attorney, Agent, or Firm*—Bell, Boyd & Lloyd LLP

(57) ABSTRACT

A satellite communications system having a fallback mode of operation, during which uplink signals are transmitted at a reduced data rate, is provided with a novel fallback mode ingress/egress mechanism utilizing a combination of a feedback-based fade detection scheme and fade detection based on parameters independent of the uplink signal transmission. The fallback mode ingress/egress mechanism is responsive to a satellite beacon signal independent of the uplink signals and to feedback signals produced by the satellite in response to the uplink signals, for requesting a satellite terminal to switch into the fallback mode when either the feedback signals indicate an increase in a fade level or in response to a first value of a selected parameter of the satellite beacon signal. The fallback mode ingress/egress mechanism requests the satellite terminal to switch out of the fallback mode in response to a second value of the satellite beacon signal parameter.

34 Claims, 6 Drawing Sheets

FALLBACK MODE INGRESS/EGRESS MECHANISM FOR SATELLITE COMMUNICATION SYSTEM

The present application is a continuation-in-part application of U.S. application Ser. No. 09/875,607 filed on Jun. 6, 2001, now U.S. Pat. No. 7,043,199 which claims priority to U.S. provisional application Ser. No. 60/214,165, filed on Jun. 26, 2000.

FIELD OF THE INVENTION

The invention relates to satellite systems, and more particularly, to a fallback mode ingress/egress scheme for changing an uplink data rate of a satellite terminal in accordance with fade due to rain, snow, solar activity or other atmospheric conditions.

BACKGROUND ART

Various atmospheric conditions along the transmission path may affect the strength of a radio signal. In particular, rain fade is one of the most common phenomena to affect satellite signals in a Ka-band satellite communications system. Two of the most common causes of the rain fade are absorption and scattering. When a transmitted radio wave strikes a rain droplet, part of the transmission energy is converted to heat energy and absorbed by the droplet. Moreover, a non-uniform transmission medium due to the raindrops in the atmosphere causes energy to be dispersed from its initial travel direction. These different reactions ultimately have the same effect—they cause any satellite system to lose some of its normal signal level.

To avoid transmission loss due to fade, our copending U.S. patent application Ser. No. 09/875,607 filed on Jun. 6, 2001 and incorporated herewith by reference, suggests using a fallback mode, during which an uplink data rate of a satellite terminal is reduced, for example, from 2 Mbps to 512 Kbps, or from 512 Kbps to 128 Kbps. The maximum fade acceptable for a particular satellite terminal depends on its maximum equivalent isotropically radiated power (EIRP) representing the total effective transmission power. By reducing the uplink data rate of the terminal, the amount of EIRP required to maintain transmission for a given packet loss rate (PLR) is substantially reduced. For example, when the data rate is reduced from 2 Mbps to 512 Kbps, the EIRP required to maintain transmission for a given PLR is reduced by $10 \log(2M/512K)=6$ dB. Therefore, additional amount of EIRP is available in the fallback mode to prevent transmission loss due to increased fade caused by heavy rains, snow, solar activity or other atmospheric conditions.

The copending U.S. patent application Ser. No. 09/875,607 discloses a feedback-based approach to entering and exiting the fallback mode of operation. This approach utilizes analysis of feedback signals produced by a satellite in response to uplink signals transmitted by a satellite terminal. For each uplink signal transmission, the satellite measures the signal-to-noise ratio (SNR) and signal-to-interference-noise ratio (SINR). This information fed back to the satellite terminal serves as an indicator of excessive fade and is utilized for the fallback mode ingress/egress procedure.

However, the feedback signals are available only when the satellite terminal transmits the uplink signals. If fade increases during a period when the satellite terminal does not transmit the uplink signals, it would be desirable to detect excessive fade before the beginning of the transmission. Otherwise, a substantial delay would occur after the beginning of the transmission before excessive signal fade is detected based on feedback signals. Therefore, it would be desirable to combine a feedback-based fade detection scheme with fade detection based on parameters independent of the uplink signal transmission.

BRIEF DESCRIPTION OF THE INVENTION

The present invention provides a novel fallback mode ingress/egress mechanism utilizing a combination of a feedback-based fade detection scheme and fade detection based on parameters independent of the uplink signal transmission. In accordance with one aspect of the invention, a satellite communications system of the present invention may comprise a data communications device for transmitting uplink signals to a satellite at a selected data rate, and having a fallback mode of operation, during which the uplink signals are transmitted at a data rate reduced compared to the selected data rate. The fallback mode ingress/egress mechanism is responsive to a satellite beacon signal independent of the uplink signals and to feedback signals produced by the satellite in response to the uplink signals, for requesting the data communications device to switch into the fallback mode when either the feedback signals indicate an increase in a fade level or in response to a first value of a selected parameter of the satellite beacon signal. The fallback mode ingress/egress mechanism may request the data communications device to switch out of the fallback mode in response to a second value of the satellite beacon signal parameter.

In accordance with another aspect of the invention, the fallback mode ingress/egress mechanism may request the data communications device to switch into the fallback mode when a predetermined number of Reed-Solomon (RS) failures indicated by the feedback signals is detected within an observation window covering a preset number of the feedback signals.

In accordance with a further aspect of the invention, the fallback mode ingress/egress mechanism may also request the data communications device to switch into the fallback mode when a signal-to-noise ratio (SNR) value of the satellite beacon signal is less than a difference between a reference SNR value and a first threshold SNR value. The fallback mode ingress/egress mechanism may request the data communications device to switch out of the fallback mode when the SNR value of the satellite beacon signal exceeds a difference between the reference SNR value and a second threshold SNR value smaller than the first SNR threshold value.

In accordance with another aspect of the invention, the SNR value of the satellite signal may be determined by averaging a measured SNR of the satellite beacon signal over a short period of time, whereas the reference SNR value may be determined by averaging the measured SNR of the satellite signal over a long period of time.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing in which.

DETAILED DESCRIPTION OF THE INVENTION

Figure 1:
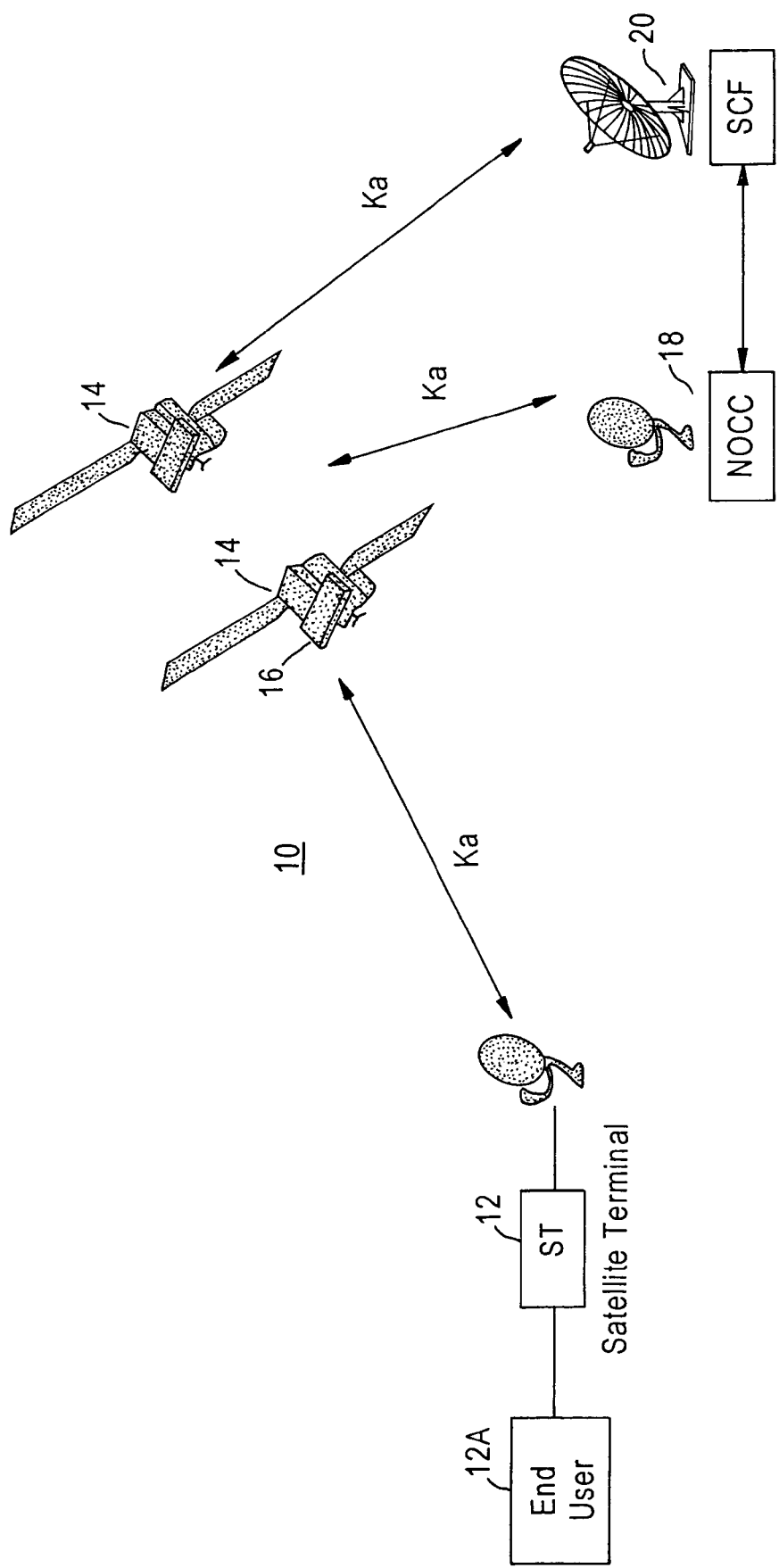
FIG. 1 illustrates a satellite communication system in accordance with an embodiment of the present invention.

An illustrative satellite system 10 in accordance with the present invention is depicted in FIG. 1. The system 10 includes multiple satellite terminals (STs) 12 that may communicate with one or multiple satellites 14 at Ka band frequencies for providing end user stations 12A connected to the STs 12 with ability to transmit and receive data, multimedia information, video, audio and graphics signals at communications rates from low Kbps to multiple Mbps. For example, the satellite system 10 may be a SPACEWAY™ satellite system that makes high-speed broadband applications available on demand to users. A payload 16 on the satellite 14 performs inter-beam routing among satellite terminals (STs) 12 in different cells. The satellite provides flexible allocation of its demodulator resources among uplink cells and can transmit packets to one or more terminals in one or more downlink cells using different delivery options such as point-to-point service, cellcasts, multicasts and broadcasts. The uplink providing transmission from a satellite terminal (SR) 12 to the payload 16 may use a frequency division multiple access/time division multiple access (FDMA/TDMA) signal format. Thus, STs are assigned with frequencies and time slots for signal transmission.

The satellite system 10 may support different data rates on a single carrier, for example, 16.384 Mbps, 2.048 Mbps and 512 Kbps. Lower rates are used when STs enter a fallback mode described below. Different connection services supported by the satellite system 10 include, but are not limited to, connectionless and connection-oriented calls. For a connection-oriented call, a satellite terminal (ST) 12 communicates with a network operations control center (NOCC) 18 that provides network management and resource allocation. In response to the request from the ST 12, the NOCC 18 issues tokens for requesting uplink bandwidth from the payload 16. In the connection mode, the NOCC 18 can determine if sufficient bandwidth is available to meet terminal requests for rate or volume traffic. For a connectionless call, an ST 12 communicates with the satellite payload 16 directly without first obtaining authorization from the NOCC 18. The ST 12 first sends a contention channel request to the payload 16 for uplink bandwidth. The payload, in turn, sends an assignment to the terminal, as well as a power measurement, to allow the ST 12 to adjust uplink power. Regardless of the connection mode used, the payload 16 receives packet segments from the STs 12 via uplinks, validates signatures provided therein, schedules packets for downlink transmission and then transmits them. The NOCC 18 interacts with a satellite control facility 20 that supports satellite management and provides telemetry, tracking and command (TT&C) functions such as command transmission, telemetry reception and processing, and ranging.

Figure 2:
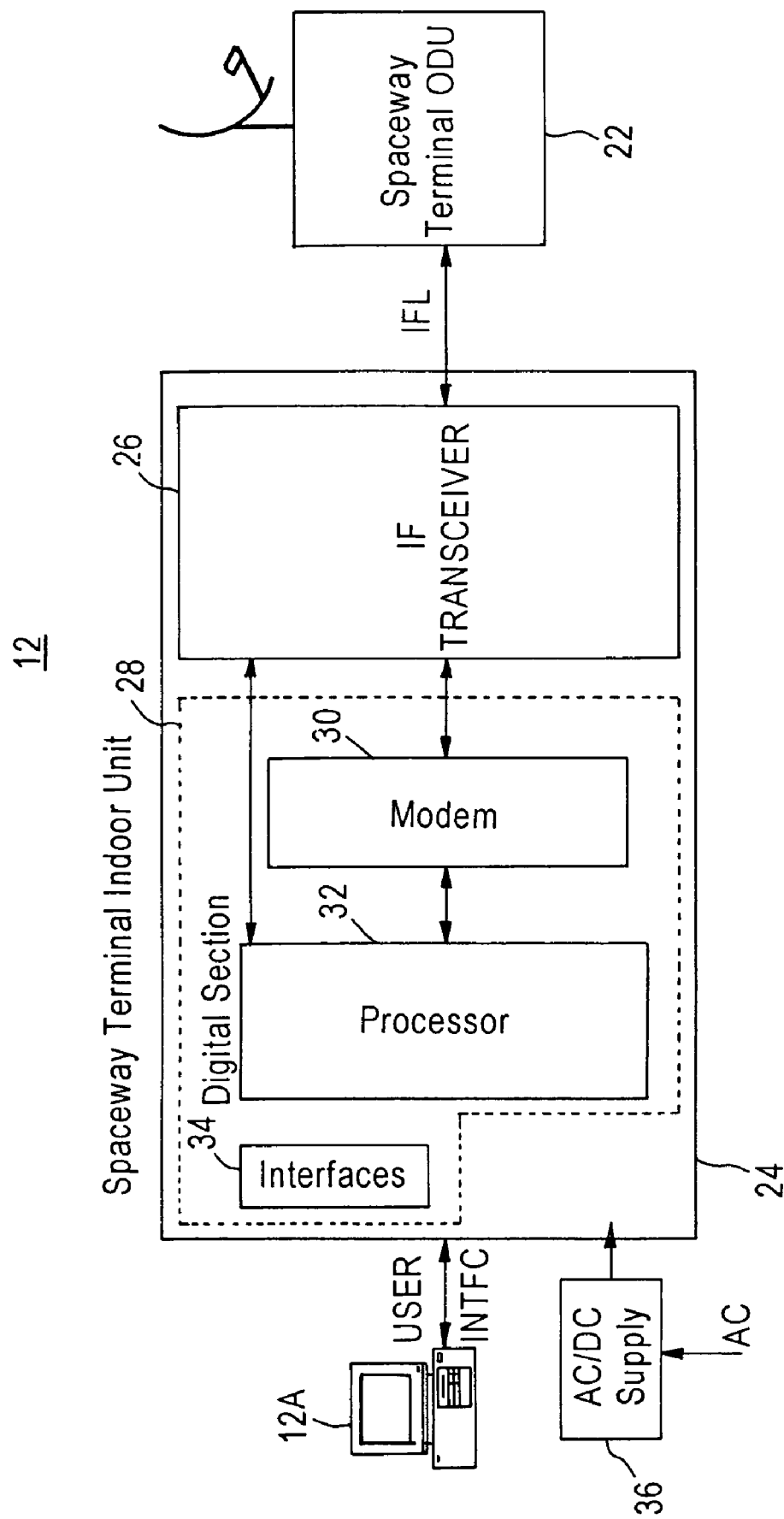
FIG. 2 is a block diagram illustrating a satellite terminal in accordance with an embodiment of the present invention.

As shown in FIG. 2, the satellite terminal 12 includes an outdoor unit 22, and an indoor unit 24 interfaced with the end user station 12A. The outdoor unit 22 connected to an antenna contains electronic circuitry for converting transmit signals supplied from the indoor unit 24 via an inter-facility cable (IFL) to the Ka band and transmitting uplink signals at Ka band frequencies. A power amplifier in the outdoor unit 22 is controlled to change the power of the transmitted signal. Further, the outdoor unit 22 receives Ka band downlink signals from the satellite 14, and converts them to intermediate frequency (IF) signals.

The indoor unit 24 contains an IF transceiver 26 that converts receive IF signals into digital signals supplied to a digital section 28, and converts transmit digital signals from the digital section 28 to IF signals supplied to the outdoor unit. The IF transceiver 26 is connected to a modem 30 containing a modulator/demodulator application-specific integrated circuit (ASIC) for modulating transmit signals and demodulating receive signals. A processor 32 coupled to modem 30 performs operations required to produce the transmit signals and recover information carried by the receive signals. In particular, the processor 32 may contain a Reed-Solomon (RS) encoder for encoding transmit signals using an RS error-correcting code. Further, as discussed below, the processor 32 performs uplink power control (ULPC) and fallback mode ingress/egress (FBMIE) processing. Interface circuitry 34 supports interfaces of the satellite terminal 12 to external systems. In particular, it provides a user interface to the end user station 12A and connects the satellite terminal 12 to the NOCC 18. An AC/DC power supply 36 converts power supplied from an AC power source into DC power required for circuitry operation.

Figure 3:
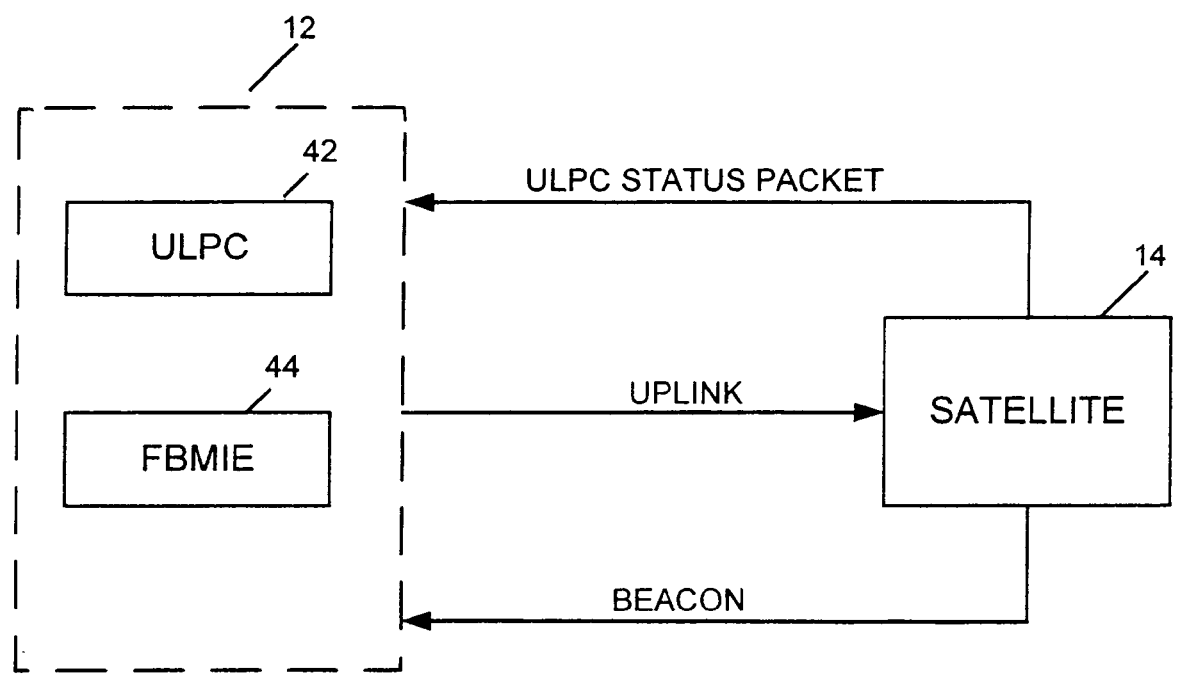
FIG. 3 is a block diagram illustrating interaction between a satellite and a fallback mode ingress/egress mechanism in accordance with an embodiment of the present invention.

Ka band transmission is affected greatly by the transmission medium environment. The major factors are the rain, cloud, scintillation and interference. As shown in FIG. 3, the processor 32 in the satellite terminal 12 contains an uplink power control (ULPC) mechanism 42 that regulates the ST transmit power to compensate for variations in the transmission medium environment. The ULPC mechanism is disclosed in more detail in our copending U.S. patent application Ser. No. 09/875,607 filed on Jun. 6, 2001 and incorporated herewith by reference.

Further, to avoid transmission loss due to fade, the ST 12 may operate in a fallback mode, during which an uplink data rate of a satellite terminal is reduced, for example, from 2 Mbps to 512 Kbps, or from 512 Kbps to 128 Kbps. As discussed above, the maximum fade acceptable for a particular satellite terminal depends on its maximum equivalent isotropically radiated power (EIRP) representing the total effective transmission power. By reducing the uplink data rate of the terminal, the amount of EIRP required to maintain transmission for a given packet loss rate (PLR) is substantially reduced. For example, when the data rate is reduced from 2 Mbps to 512 Kbps, the EIRP required to maintain transmission for a given PLR is reduced by 10 log(2M/512K)=6 dB. Therefore, additional amount of EIRP is available in the fallback mode to prevent transmission loss due to increased fade caused by heavy rains, snow, solar activity or other atmospheric conditions.

The processor 32 contains a fallback mode ingress/egress (FBMIE) mechanism 44 that initiates switching into a fallback mode to reduce an uplink data rate when a fade increase is detected, and initiates switching out of the fallback mode to resume operation at a normal uplink data rate when fade reduces. For their operations, each of the ULPC mechanism 42 and FBMIE mechanism 44 utilizes a satellite beacon signal independent of uplink signals transmitted by the ST 12, and satellite feedback signals produced in response to the transmitted uplink signals.

The satellite beacon signal is a constant level, low power beacon signal at a Ka band frequency transmitted by the satellite 14 to support uplink power control and telemetry operations. The demodulator in the modem 30 calculates the signal-to-noise ratio (SNR) of the beacon signal received by the ST 12 and supplies the calculated value to the processor 32 for supporting operations of the ULPC mechanism 42 and FBMIE mechanism 44. For example, the ST 12 may make beacon SNR measurements every 3 ms.

Further, the satellite payload 16 is provided with a power control module that performs measurements based on uplink signals from the ST 12 and generates a feedback signal supplied back to the ST 12. The feedback signal comprises a ULPC status packet used by the ULPC mechanism 42 and FBMIE mechanism 44 at the ST 12 to adjust transmit power and initiate switching into the fallback mode. The ULPC status packets generated at the satellite 14 may be cellcast to individual STs every 96 ms. The successful reception and the latency of these packets, however, is contingent upon the weather and/or channel impairments and satellite queuing delays. The ULPC status packet comprises such parameters of the uplink signal as the noise floor, the SNR, and the signal-to-noise-and-interference ratio (SINR) measured at the satellite 14.

The ULPC status packet also provides Reed-Solomon (RS) pass/fail indication showing whether the RS-encoded uplink signal passes or fails an RS decoding procedure performed at the satellite 14. Since the transmission medium is subject to various types of noise, distortion and interference, an uplink signal received at the satellite 14 differs from the respective signal transmitted by the ST 12. Therefore, to provide protection against errors that occur during signal transmission, the ST 12 performs error-correcting encoding of transmitted uplink signals, for example, RS encoding. An RS decoder at the satellite 14 decodes the RS-encoded uplink signal to correct errors in the received signal. If all errors are corrected, the RS decoder indicates that the received signal matches the respective transmitted signal. However, if the received signal contains more errors that the RS decoder is able to correct, the decoder indicates that the uplink signal fails the RS decoding procedure.

Figure 4:
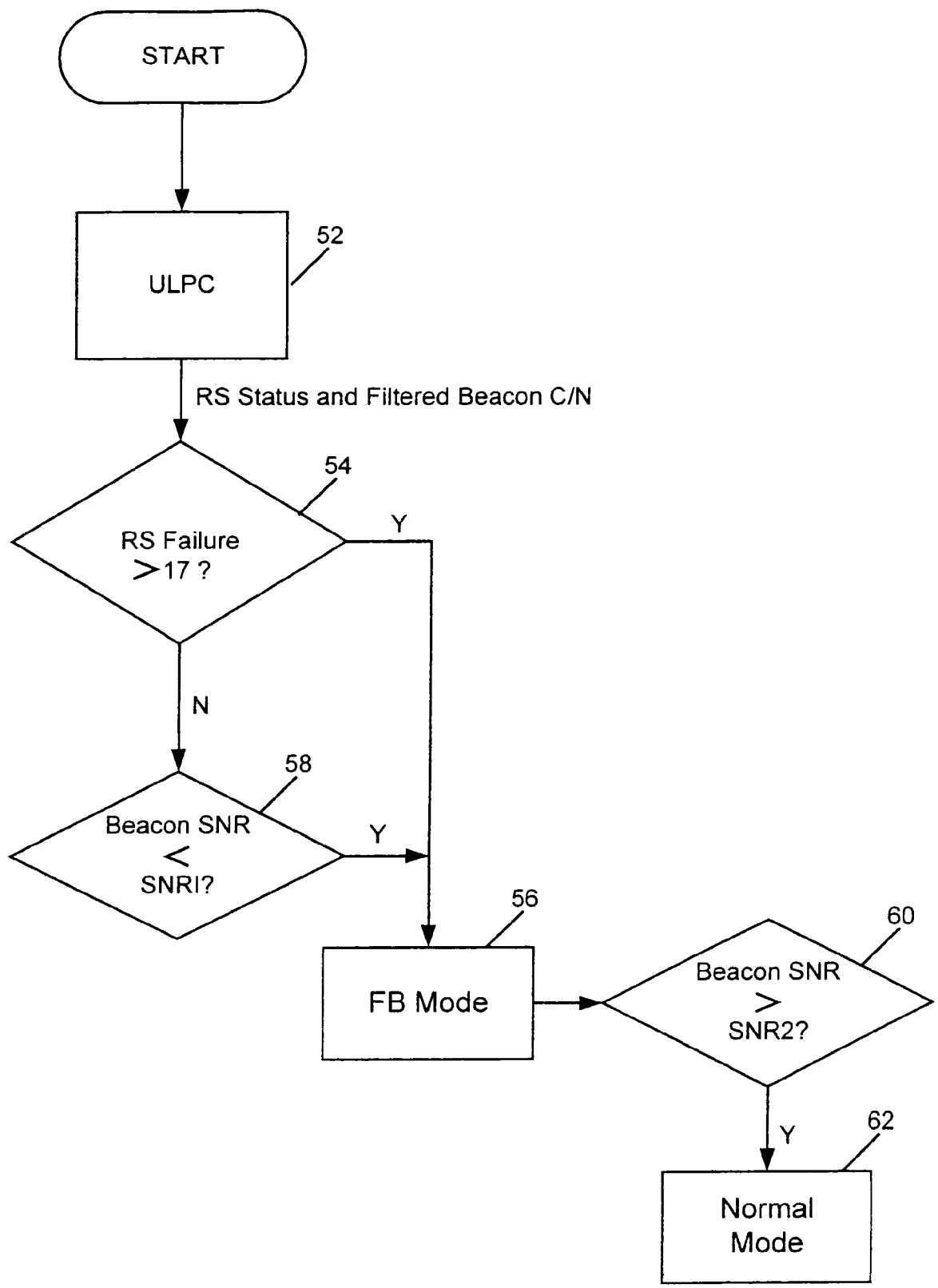
FIG. 4 is a flow chart illustrating operation of the fallback mode ingress/egress mechanism in accordance with an embodiment of the present invention.

FIG. 4 is a flow chart illustrating operation of the FBMIE mechanism 44 of the present invention. During the uplink power control operations (block 42) performed by the ULPC mechanism 52, the processor 32 monitors the RS pass/fail indicators in the ULPC status packets received by the ST 12 within an observation window including a predetermined number of consecutive feedback signals received by the ST 12.

Figure 5:
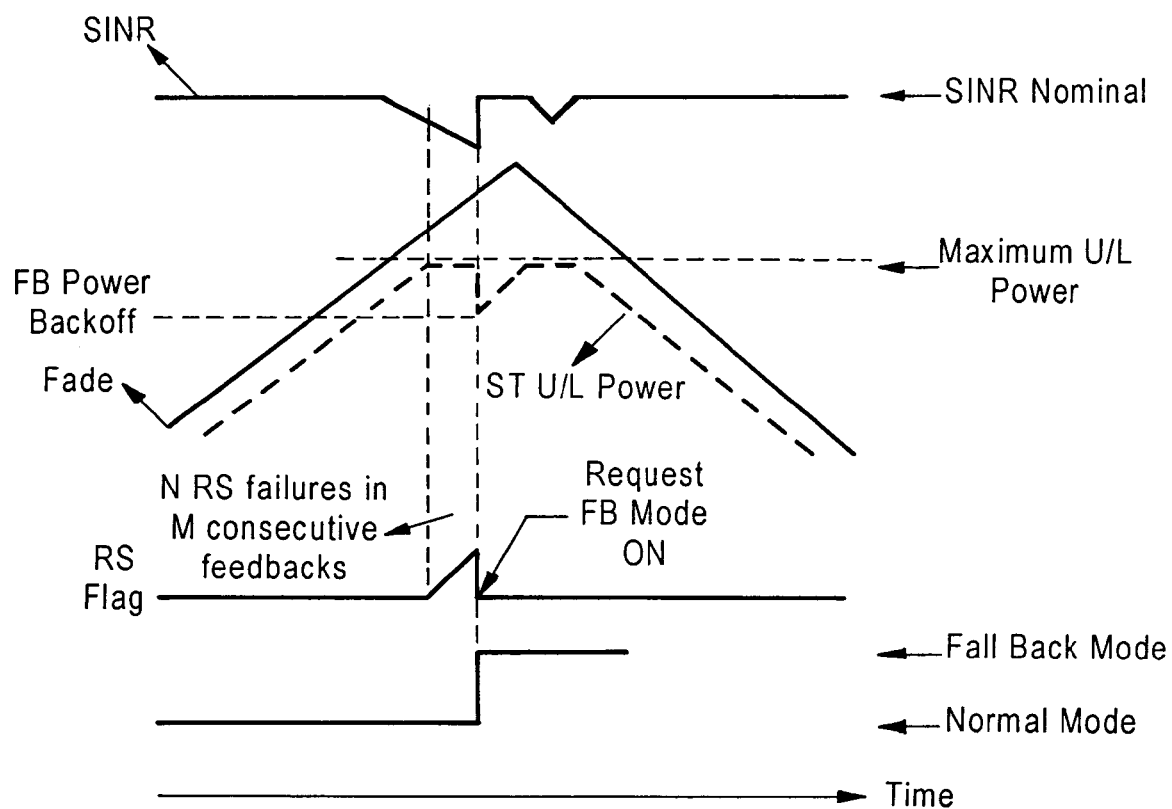
FIG. 5 is a diagram illustrating a feedback-based fallback mode ingress scheme in accordance with an embodiment of the present invention.

As shown in FIG. 5, due to the ULPC procedure, a nominal SINR value is maintained up to a certain fade depth. Beyond this fade depth, the SINR degrades and the frequency of feedback signals indicating the Reed-Solomon failure increases. The SINR degradation is particularly severe at fades for which the ST uplink (U/L) power has saturated i.e., when the ST transmit power is at the maximum level. Such extreme fade depths may be determined when more than N Reed-Solomon failures is detected over an observation window including M consecutive feedback signals, where N is a predetermined number experimentally determined for a particular width of the observation window; and for each failure $P_{UL}(k)+FTF \geqq P_{max}$, where $P_{UL}(k)$ is the U/L power sent at time k, FTF is a frequency table tracking filter value that estimates the shape of the U/L chain spectrum, and $P_{max}$ is the ST maximum power.

For example, N may be equal to 17, and M may be equal to 20. The observation window may be initiated when the SINR is reduced by a predetermined amount with respect to its nominal value.

Hence, when the FBMIE mechanism 44 detects more than N ULPC status packets indicating RS failures in M consecutive feedback signals (block 54), and for each failure $P_{UL}(k)+FTF \geqq P_{max}$, the FBMIE mechanism 44 produces an FB mode ingress request to initiate switching of the ST 12 from a normal mode of operation into a fallback mode of operation (block 56). The FB mode ingress request is supplied to a bandwidth manager that makes a decision as to whether the ST 12 should be switched into the fallback mode to operate at a reduced uplink data rate. The bandwidth manager may be provided in the ST 12 or externally, for example, in the NOCC 18.

To maintain the nominal SINR when a fade level is high, the ULPC mechanism 42 reduces the uplink power value by a predetermined amount after the ST 12 switches into the fallback mode. As discussed above, the reduction of the uplink data rate enables the ST 12 to substantially reduce the transmit power.

The feedback signals providing RS pass/fail indication are available only when the satellite terminal transmits the uplink signals. If fade increases during a period when the satellite terminal does not transmit the uplink signals, the FBMIE mechanism 44 is not able to detect a high fade level based on the RS failures. Therefore, if feedback signals are not available or the number of detected RS failures does not exceed the above-discussed number N pre-set in the feedback-based operation 54, the FBMIE mechanism 44 monitors the signal-to-noise ratio (SNR) of the beacon signal (block 58).

Figure 6:
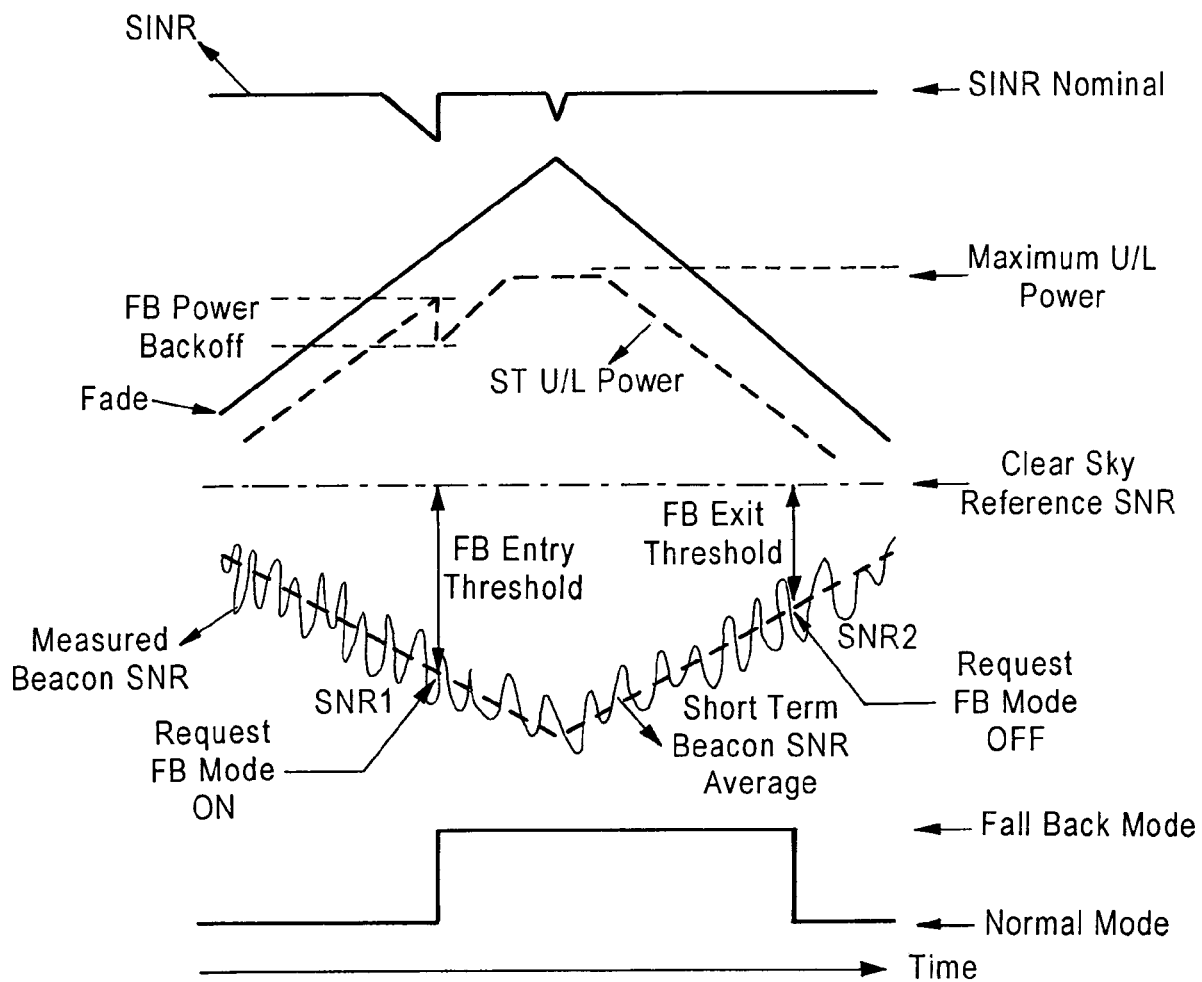
FIG. 6 is a diagram illustrating a beacon SNR-based fallback mode ingress and egress schemes in accordance with an embodiment of the present invention.

As illustrated in FIG. 6, if the SNR of the beacon signal is less than a predetermined SNR value SNR1, the FBMIE mechanism 44 produces the fallback mode ingress request signal to initiate switching the ST 12 into the fallback mode. More specifically, to support the ULPC operations, the ULPC mechanism 42 keeps a long term and a short term average of the beacon SNR measured by the ST 12. The long term average corresponding to the measured beacon SNR value averaged over a long period of time, for example, a week, is used to establish a clear sky SNR reference corresponding to the beacon SNR value at clear sky conditions. The short term average corresponding to the measured beacon SNR value averaged over a short period of time, for example, several seconds, is monitored by the FBMIE mechanism 44 to detect a high fade level requiring switching to the fallback mode. As the fade increases, the short term SNR average decreases in magnitude. When the short term SNR average is smaller than a difference between the clear sky SNR reference and a predetermined threshold, the FBMIE mechanism 44 issues the FB mode ingress request signal to initiate a transition of the ST 12 from the normal mode into the fallback mode. The threshold may be established for a particular ST and may depend on such parameters as power output and data rate.

To implement switching into the fallback mode based on the beacon SNR, three variables are introduced. They include medium term beacon average $$\left(\frac{C}{N}\right)_b^{FB}$$

to indicate the rain fade, long term beacon average for fall back mode $$\left(\frac{C}{N}\right)_b^{long\_ave\_fb},$$

and clear sky beacon SNR reference $$\left(\frac{C}{N}\right)_b^{ref\_fb}.$$

To save computational resource, ST may use the short-term beacon $$\left(\frac{C}{N}(+)\right)_b$$

by decimating it every 96 ms. The decimated $$\left(\frac{C}{N}(+)\right)_b$$

is filtered to compute $$\left(\frac{C}{N}\right)_b^{FB}$$

as follows, $$\left(\frac{C}{N}(+)\right)_b^{FB} = \alpha_{FB} \cdot \left(\frac{C}{N}(-)\right)_b^{FB} + (1-\alpha_{FB}) \cdot \left(\frac{C}{N}(+)\right)_b$$

where $$\left(\frac{C}{N}(+)\right)_b$$

is the measured beacon SNR and $\alpha_{FB}$ is typically 0.999.

$$\left(\frac{C}{N}\right)_b^{long\_ave\_fb}$$

is used to generate the beacon reference SNR for clear sky. It is obtained by decimating the short term average, $$\left(\frac{C}{N}(+)\right)_b,$$

to change the sample period from 3 ms to 210 sec, and then filtering the decimated $$\left(\frac{C}{N}(+)\right)_b$$

as follows, $$\left(\frac{C}{N}(+)\right)_b^{long\_ave\_fb} = \varsigma_{fb}\left(\frac{C}{N}(-)\right)_b^{long\_ave\_fb} + (1-\varsigma_{fb})\left(\frac{C}{N}(+)\right)_b$$

where $\varsigma_{fb}$ is typically 0.99965, for a week average [210/(1−0.9965)=168 hours=7 days]

$$\left(\frac{C}{N}\right)_b^{ref\_fb}$$

is updated as follows,
If $$\text{If } \left(\frac{C}{N}(+)\right)_b^{long\_ave\_fb} > \left(\frac{C}{N}\right)_b^{ref\_fb} - \text{Ref\_margin} \text{ Then}$$

Then $$\left(\frac{C}{N}\right)_b^{ref\_fb} = \left(\frac{C}{N}(+)\right)_b^{long\_ave\_fb}$$

Where, Ref_margin is typically 0.25 dB.

Hence, when the short term SNR average is smaller than a difference between the clear sky SNR reference and a predetermined ingress threshold, the FBMIE mechanism 44 issues the FB mode ingress request signal to initiate a transition of the ST 12 from the normal mode into the fallback mode, i.e. the ST 12 switches into the fallback mode when $$\left(\frac{C}{N}(+)\right)_b^{FB} < \left(\frac{C}{N}\right)_b^{ref\_fb} - \text{FB\_Enter\_Backoff, where}$$

FB_Enter_Backoff=$f_{dl}^{entry}+\Delta N_b^{entry}+(dG_{max}-dG)+(P_{max}-46.9)/\lambda$ is the ingress threshold $f_{dl}^{entry}$ is the downlink fade for fallback mode entry, $\Delta N_b^{entry}$ is the beacon SNR reduction due to noise floor rise in rain fade of $f_{dl}^{entry}$, dG is the antenna gain, and $\lambda$ is the ratio of the uplink fade to the downlink fade.

Since the packet loss rate drop is mainly caused by the inability of the ST to provide sufficient output power, the ingress threshold depends on $P_{max}$. For example, for $P_{max}$=46.9 dBW, and antenna size of 0.74 m, $f_{dl}^{entry}$=5.0 dB, $\Delta N_b^{entry}$=2.25 dB.

As shown in FIG. 6, when a fade level reduces, the short term beacon SNR average increases. When the short term beacon SNR average is higher than a predetermined SNR value SNR2 (block 60), the FBMIE mechanism 44 may initiate switching from the fallback mode of operation into the normal mode to increase the uplink data rate reduced in the fallback mode. More specifically, the FBMIE mechanism 44 produces a fallback mode egress request signal when the short term SNR average is higher than a difference between the clear sky SNR reference and a predetermined egress threshold, i.e.

$$\left(\frac{C}{N}(+)\right)_b^{FB} > \left(\frac{C}{N}\right)_b^{ref\_fb} - FB\_Exit\_TH,$$

where FB_Exit_TH=$f_{dl}^{exit}$+$\Delta N_b^{exit}$+(dG$_{max}$-dG)+(P$_{max}$-46.9)/λ the downlink fade for fallback mode exit, $\Delta N_b^{exit}$ is the beacon SNR reduction due to noise floor rise in downlink (D/L) rain fade of $f_{dl}^{exit}$, dG is antenna gain.

The egress threshold also depends on $P_{max}$. For example, for $P_{max}$=46.9 dBW, and antenna size being 0.74 mm, $f_{dl}^{exit}$=2.0 dB, $\Delta N_b^{exit}$=1.5 dB.

The fallback mode egress request signal is supplied to the bandwidth manager that makes a decision as to returning the ST 12 to the normal mode of operation to resume transmission at the normal uplink data rate (block 62).

Hence, the FBMIE mechanism 44 is responsive to a combination of feedback signals produced in response to the ST uplink signals, and a satellite beacon signal independent from the ST uplink signals, to initiate fallback mode ingress and egress operations even when the ST does not transmit uplink signals. Thus, when an increase in a fade level warrants switching into the fallback mode, the ST is able to begin transmitting at a reduced uplink data rate without the delay required to detect the fade increase.

Although the present invention has been described with reference to preferred embodiments thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A satellite terminal for providing data communications with a satellite, comprising:
   communications circuitry for providing signal transmission to the satellite at a selected data rate, and
   a data rate change request mechanism responsive to a satellite signal independent of the signal transmission from the communications circuitry for requesting the communications circuitry to reduce the selected data rate in response to a first value of a parameter of the satellite signal;
   wherein the data rate change request mechanism requests the communications circuitry to return to the selected data rate in response to a second value of the satellite signal parameter.

2. The satellite terminal of claim 1, wherein the data rate change request mechanism is further responsive to feedback signals produced by the satellite in response to the signal transmission from the communications circuit.

3. The satellite terminal of claim 2, wherein the data rate change request mechanism is configured to request the communications circuitry to reduce the selected data rate when the feedback signals indicate an increase in signal fade.

4. The satellite terminal of claim 3, further comprising an encoder for providing error-correcting coding of a signal transmitted to the satellite.

5. The satellite terminal of claim 1, wherein the data rate change request mechanism is configured to request the communications circuitry to reduce the selected data rate when a signal-to-noise ratio (SNR) value of the satellite signal is less than a first predetermined SNR value.

6. The satellite terminal of claim 5, wherein the data rate change request mechanism is configured to request the communications circuitry to return to the selected data rate when the SNR value of the satellite signal exceeds a second predetermined SNR value.

7. The satellite terminal of claim 6, wherein the first and second SNR values are set with respect to a reference SNR value.

8. The satellite terminal of claim 7, wherein the reference SNR value represents a measured SNR of the satellite signal averaged over a long period of time.

9. The satellite terminal of claim 8, wherein the SNR value of the satellite signal represents the measured SNR of the satellite signal averaged over a short period of time.

10. A satellite terminal for providing data communications with a satellite, comprising:
    communications circuitry for providing signal transmission to the satellite at a selected data rate,
    a data rate change request mechanism responsive to a satellite signal independent of the signal transmission from the communications circuitry for requesting the communications circuitry to reduce the selected data rate in response to a first value of a parameter of the satellite signal; and
    an encoder for providing error-correcting coding of a signal transmitted to the satellite;
    wherein the data rate change request mechanism is further responsive to feedback signals produced by the satellite in response to the signal transmission from the communications circuit, each of the feedback signals indicating whether the encoded signal passes or fails a decoding procedure at the satellite and wherein the data rate change request mechanism is configured to request the communications circuitry to reduce the selected data rate when the feedback signals indicate an increase in signal fade.

11. The satellite terminal of claim 10, wherein the data rate change request mechanism is configured to request the communications circuitry to reduce the selected data rate when a first predetermined number of feedback signals indicates that the encoded signal fails the decoding procedure.

12. The satellite terminal of claim 11, wherein the first predetermined number of feedback signals is detected among a second predetermined number of consecutive feedback signals.

13. The satellite terminal of claim 11, wherein the transmitted signal is encoded using a Reed-Solomon (RS) code.

14. A satellite communications system comprising:
    a data communications device for transmitting uplink signals to a satellite at a selected data rate, and having a fallback mode of operation, during which the uplink signals are transmitted at a data rate reduced compared to the selected data rate; and a fallback mode ingress/egress mechanism responsive to a satellite beacon signal independent of the uplink signals and to feedback signals produced by the satellite in response to the uplink signals, for requesting the data communications device to switch into the fallback mode when either the feedback signals indicate an increase in signal fade or in response to a first value of a parameter of the satellite beacon signal.

15. The satellite communications system of claim 14, wherein the fallback mode ingress/egress mechanism is configured to request the data communications device to switch out of the fallback mode in response to a second value of the satellite beacon signal parameter.

16. The satellite communications system of claim 15, wherein the fallback mode ingress/egress mechanism is configured to request the data communications device to switch into the fallback mode when an SNR value of the satellite beacon signal is less than a difference between a reference SNR value and a first threshold SNR value.

17. The satellite communications system of claim 16, wherein the fallback mode ingress/egress mechanism is configured to request the data communications device to switch out of the fallback mode when an SNR value of the satellite beacon signal exceeds a difference between the reference SNR value and a second threshold SNR value smaller than the first SNR threshold value.

18. The satellite communications system of claim 14, wherein the fallback mode ingress/egress mechanism is configured to request the data communications device to switch into the fallback mode in response to a predetermined number of RS failures indicated by the feedback signals.

19. The satellite communications system of claim 14, wherein the predetermined number of RS failures is detected within an observation window covering a preset number of the feedback signals.

20. A method of operating a satellite terminal interacting with a satellite, comprising the steps of:
transmitting an uplink signal at a selected data rate,
receiving a satellite signal transmitted by the satellite independently of the uplink signal, initiating reduction of the selected data rate when feedback signals produced by the satellite in response to the up-link signal transmission indicate an increase in signal attenuation.
initiating reduction of the selected data rate in response to a first value of a parameter of the satellite signal, and
initiating return to the uplink signal transmission at the selected data rate in response to a second value of a parameter of the satellite signal.

21. The method of claim 20, wherein the parameter of the satellite signal represents an SNR.

22. The method of claim 21, wherein the reduction of the selected data rate is initiated when an SNR value of the satellite signal is less than a difference between a reference SNR value and a first threshold SNR value.

23. The method of claim 22, wherein the return to the selected data rate is initiated when the SNR value of the satellite signal exceeds a difference between the reference SNR value and a second threshold SNR value smaller than the first SNR threshold value.

24. The method of claim 23, wherein the reference SNR value is determined by averaging a measured SNR of the satellite signal over a long period of time.

25. The method of claim 24, wherein the SNR value of the satellite signal is determined by averaging the measured SNR of the satellite signal over a short period of time.

26. The method of claim 25, wherein the first and second threshold SNR values depend on maximum transmit power.

27. The method of claim 20, further comprising the step of encoding transmitted uplink signals using an error-correction code.

28. A method of operating a satellite terminal interacting with a satellite, comprising the steps of:
transmitting an uplink signal at a selected data rate,
receiving a satellite signal transmitted by the satellite independently of the uplink signal,
initiating reduction of the selected data rate when feedback signals produced by the satellite in response to the up-link signal transmission indicate an increase in signal attenuation,
initiating reduction of the selected data rate in response to a first value of a parameter of the satellite signal, and
encoding transmitted uplink signals using an error-correction code;
wherein each of the feedback signals indicates whether an encoded uplink signal passes or fails a decoding procedure at the satellite.

29. The satellite terminal of claim 28, wherein the reduction of the selected data rate is initiated when a first predetermined number of feedback signals indicate that the encoded uplink signal fails the decoding procedure.

30. The satellite terminal of claim 29, wherein the first predetermined number of feedback signals is detected within an observation window including a second predetermined number of consecutive feedback signals.

31. The satellite terminal of claim 29, wherein the transmitted uplink signals are encoded using a Reed-Solomon code.

32. A method of changing an uplink data rate in a satellite communications system, comprising the steps of: receiving feedback signals produced in response to encoded uplink signals, receiving satellite signals independent of the uplink signals, detecting a number of failed feedback signals indicating that the encoded uplink signals fail a decoding procedure, if the number of failed feedback signals exceeds a predetermined number, initiating reduction of the uplink data rate, if the number of failed feedback signal does not exceed the predetermined number, detecting a SNR value of the satellite signal, initiating reduction of the uplink data rate when the SNR value of the satellite signal is less than the first predetermined level.

33. The method of claim 32, further comprising the step of initiating increase of the reduced uplink data rate when the SNR value of the satellite signal exceeds a second predetermined level.

34. The method of claim 32, wherein the uplink signals are encoded using a Reed-Solomon code.

* * * * *